United States Patent [19]

Blanchet

[11] Patent Number: 5,203,219

[45] Date of Patent: Apr. 20, 1993

[54] SPEED REDUCER FOR A WIPER MECHANISM, HAVING A HOUSING CLOSED BY A COVER

[75] Inventor: Pierre Blanchet, Lencloitre, France

[73] Assignee: Valeo Systemes d'Essuyage, Montigny-le-Bretonneux, France

[21] Appl. No.: 770,589

[22] Filed: Oct. 3, 1991

[30] Foreign Application Priority Data

Oct. 5, 1990 [FR] France .................. 90 12284

[51] Int. Cl.⁵ .......................................... F16H 21/40
[52] U.S. Cl. ................................ 74/42; 74/32; 74/606 R; 384/11
[58] Field of Search ............. 74/32, 42, 606 R; 384/11

[56] References Cited

U.S. PATENT DOCUMENTS

| | | | |
|---|---|---|---|
| 2,328,918 | 9/1943 | McManus | 384/11 |
| 2,861,457 | 11/1958 | Harrison | 74/42 X |
| 2,893,251 | 7/1959 | McWethy | 74/42 |
| 3,415,132 | 12/1968 | Druseikis | 74/42 |
| 4,189,958 | 2/1980 | Braun | 74/606 R |
| 4,263,821 | 4/1981 | Savage et al. | 74/42 X |

FOREIGN PATENT DOCUMENTS

| | | |
|---|---|---|
| 0316831 | 11/1988 | European Pat. Off. |
| 3247421 | 7/1984 | Fed. Rep. of Germany |
| 3740312 | 11/1987 | Fed. Rep. of Germany |
| 2552723 | 9/1984 | France |
| 2603358 | 8/1986 | France |

*Primary Examiner*—Allan D. Herrmann
*Attorney, Agent, or Firm*—Morgan & Finnegan

[57] ABSTRACT

A speed reducer, in particular for converting continuous rotary motion of a drive motor to alternating rotary motion of an output shaft for operating a wiper linkage, and a hollow casing, which is closed by a cover with, in the hollow interior of the casing, a toothed wheel carrying a crank pin which is eccentric with respect to the axis of rotation of the toothed wheel, the crank pin being freely rotatable and free to move axially, with the crank pin driving a crank and connecting rod system which converts the continuous rotary motion of the toothed wheel into the alternating motion of the output shaft. The cover has at least one flat sliding thickened portion, of a material having a low coefficient of friction, arranged on its inner face and directed into the hollow interior of the casing.

12 Claims, 2 Drawing Sheets

SPEED REDUCER FOR A WIPER MECHANISM, HAVING A HOUSING CLOSED BY A COVER

FIELD OF THE INVENTION

This invention relates to speed reducers of the kind having a casing containing a speed reducing mechanism, and a cover closing the casing. In particular the invention relates to such speed reducers for driving a wiper mechanism and for converting continuous rotary motion to oscillating rotary motion.

BACKGROUND OF THE INVENTION

As is already known, such a speed reducer consists of an electric motor, having a rotor shaft which is extended beyond the motor itself and which carries a worm located in a hollow casing closed by a cover. Within the hollow interior of the casing is a speed reducing mechanism comprising a toothed wheel which is driven in rotation by the worm, and which drives, through an eccentric crank pin carried by the toothed wheel for free rotation and axial movement, a crank and connecting rod system which is coupled in a fixed manner to the said crank pin, the speed reducing system being such as to convert the continuous circular motion of the toothed wheel into alternating or oscillating rotary motion of an output shaft, which is carried by the casing and passes through the base of the latter so as to drive a wiper linkage.

Such a speed reducer must be able to transmit very large forces, and it is necessary to immobilise the crank pin carried by the toothed wheel against axial translational movement, by mounting it in such a way that the crank pin is unable to slide axially under the force transmitted by the toothed wheel. Such axial movement would damage the cover and set up unacceptable noise, besides causing the system and the output shaft to move in corresponding axial movement because of the rigid coupling with the crank and connecting rod system. This in turn gives rise to risks of damage and rubbing between the crank and connecting rod system and the cover, producing further noises, either in the form of audible bumps or grating noises.

It has already been proposed, for example in the specification of published German patent application No. DE 3 247 421A, to use the cover itself as an abutment surface for the upper end of the eccentric crank pin carried by the toothed wheel. For this purpose, the upper end of the crank pin is provided with an engagement means in the form of a cap of plastics material which engages on the inner surface of the cover, and on the surface of the connecting rod of the crank and connecting rod system facing the cover. The plastics material of this cap is one having a low coefficient of friction, so that the latter can engage with low friction on the cover without causing any significant frictional heating, and without adversely affecting either the rotation of the crank pin in the housing which is provided for this purpose in the toothed wheel, or its circular movement caused by the toothed wheel.

However, this arrangement, though effective, is relatively expensive in terms of assembly costs, and even so, the friction which it generates is not negligible. In the assembly operation, the cap is a very small component, which is not easy to fit on to the end of the eccentric crank pin, and the cap is liable quite easily to become separated from the latter during subsequent manipulations in the assembly process.

In addition, the cap is trapped between the inner face of the cover and the surface of the connecting rod that faces towards the cover. Having regard to manufacturing tolerances, this can produce quite a large axial thrust against the cap, giving rise to frictional braking forces at the surfaces in contact with the cap. This is detrimental to efficient operation of the assembly. Again, it is necessary to provide a large number of different sizes of caps for different types of speed reducer.

DISCUSSION OF THE INVENTION

According to the present invention, a speed reducer, in particular for driving an oscillating screen wiper mechanism and including a closure cover for a hollow casing of the speed reducer, wherein the latter comprises, within the hollow interior of the said casing, a toothed wheel which is rotatable about an axis and which carries a crank pin mounted for free rotation and axial movement of the latter, the pin being mounted axially and eccentrically with respect to the axis of the said wheel, with the latter driving a crank and connecting rod system so as to convert the continuous rotary motion of the said wheel into alternating rotary motion of an output shaft, is characterised in that the cover has on its inner face directed into the casing at least one flat, sliding, thickened portion of a material having a low coefficient of friction.

Thus the crank pin, which is mounted at its lower end in a housing on the toothed wheel, is retained against axial translational movement at its upper surface by simple contact with the thickened portion, thus avoiding the need to provide a separate component on the crank pin.

According to another feature of the invention, a said thickened portion is provided over the whole circular path of the crank pin about the axis of rotation of the toothed wheel. The crank pin is thus retained axially over the whole of its circular path.

The other features and advantages of the invention will appear more clearly from the description that follows, of a preferred embodiment of the invention, by way of example only and with reference to the accompanying drawings.

BRIEF DESCRIPTION OF THE DRAWINGS FIG. 1 is a diagrammatic view in cross section showing a speed reducer unit having a cover according to the invention.

DESCRIPTION OF A PREFERRED EMBODIMENT OF THE INVENTION

Figure 1:
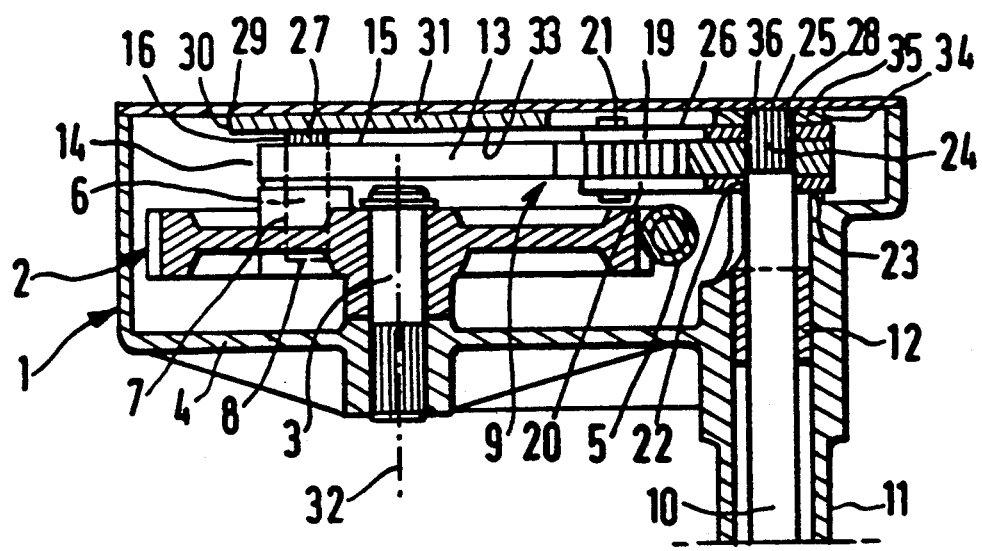
Figure 2:
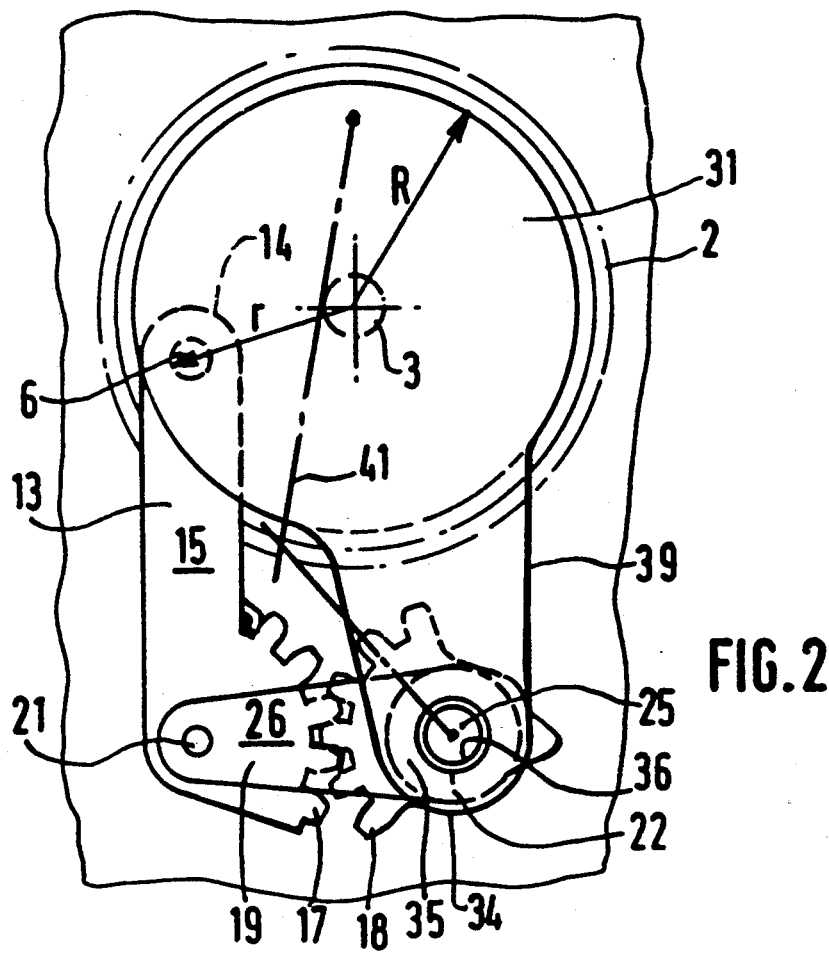
FIG. 2 is a view in elevation on the unit shown in FIG. 1, showing the element mounted on the cover according to the invention, and in which the cover is considered as being transparent.

Referring to FIGS. 1 and 2, this shows a speed reducer unit for driving a windshield wiper. The unit has a casing 1, containing a speed reducing system comprising a toothed wheel 2 which is freely mounted in rotation on a shaft 3 carried by the base 4 of the casing 1. The toothed wheel 2 is driven in rotation by a worm 5 carried by the rotor of an electric motor (not shown).

The wheel 2 carries a crank pin 6 which is substantially parallel to the shaft 3, and which is eccentric with respect to the latter. The crank pin 6 is mounted, so as to be free to rotate and to move axially, within a housing 7 having a closed base 8, formed on the wheel 2. The crank pin 6 is rigidly connected, for example by crimping, to a crank and connecting rod system 9, which converts the continuous rotary motion of the wheel 2 into oscillating rotary movement of an output shaft 10 which is mounted in a sleeve 11 formed in the base of the housing 1. The shaft 10 is carried in an anti-friction bearing sleeve 12.

The crank and connecting rod system 9 includes an arm 13 which acts as the crank and which is fixed at one of its ends, 14, to the crank pin 6, with an end portion 16 of the crank pin 6 extending beyond its outer face 15. The other end of the crank 13 has a toothed sector 17 which meshes with a further toothed sector 18. The toothed sector 18 is fixed with respect to the output shaft 10, so as to constitute a connecting rod. Two plates 19 and 20 are arranged on either side of the longitudinal faces of the toothed sectors 17 and 18, so as to couple the arm 13 rigidly to the shaft 10, firstly through a bar 21 which is freely rotatable and which is arranged at one end of the plates 19 and 20, extending through the thickness of the latter, and secondly by an opening 22 which is formed in the other end of the plates 19 and 20. In the plate 20, the opening 22 is arranged between the lower face of the toothed sector 18 and the bearing face 23 of the base of the casing 1, being engaged along the output shaft 10. In the plate 19, the opening 22 surrounds the upper end 24 of the output shaft 10, a portion 25 of which extends beyond the outer face 26 of the plate 19. In practice, the terminal upper face 27 of the end portion 16 of the crank pin 6 lies substantially in the same plane as the outer surface 26 of the plate 19, while the terminal upper surface 28 of the end portion 25 of the output shaft 10 lies in a higher plane, as can be seen from FIG. 1. However, the crank and connecting rod system can of course instead be of a conventional type having two links, articulated to each other through a pivot axis.

As is best seen in FIG. 1, the casing 1 is closed in its upper part by a cover plate 29 which is generally formed from a thin flat metal blank, and which is joined to the edge of the casing 1 by any known means, for example by crimping, by threaded fasteners, or by riveting. The cover 29 has a thickened portion 30 on its inner face, directed into the hollow interior of the casing 1. The thickened portion 30 consists, in the example shown, of a flat pad 31 having a low coefficient of friction and being carried in a fixed manner on the cover 29.

Referring to FIG. 2, the pad 31 has a circular periphery, the radius R of which is at least equal to the radius r considered between the axis of rotation 32 of the toothed wheel 2 and the periphery of the crank pin 6 that is closest to the outer edge of the toothed wheel 2. The radius R thus corresponds to the circular displacement of the crank pin 6, about the axis 32 of the shaft 3 when the pin 6 is moved by the toothed wheel 2. The pad 31 is coaxial with the shaft 3.

Thus, during fitting and attachment of the cover 29 on the edge of the housing 1, the outer face 33 of the thickened portion 30, i.e. the pad 31, facing into the casing 1, is of such a thickness that the pad 31 is able to slide on the upper terminal surface 27 of the crank pin 6, restraining the latter against axial movement between the outer face 33 of the pad and the base 8 of the housing 7. Because of the composition and circular shape of the pad 31, the terminal surface 27 is able easily to slide during the whole of the circular movement of the pin 6 about the axis 32, when the pin 6 is set in the axial direction.

Preferably, the terminal surface 27 is curved towards the cover 29, so that it may for example have a hemispherical surface which thus enables point contact to be obtained between it and the cooperating surface of the pad 31.

Still referring to FIG. 2, the cover 29 also has on its inner face a second fixed thickened portion 34, which is defined by a ring 35 having a bore 36, the diameter of which is greater than that of the end portion 25 of the output shaft 10. The outer diameter of the ring 35 is such that the ring at least partially overlies the end of the plate 19 adjacent to the output shaft 10, being disposed coaxially with the end portion 25 of the latter.

Thus, while the cover 29 is being fitted to the casing 1 so as to close the latter, the ring 35 surrounds the end portion 25, and bears (through its face which is directed into the casing) on the outer face 26 of the plate 19, and more particularly at the level of the surface mentioned above surrounding the end portion 25. The upper terminal surface 28 of the end portion 25 is of course so arranged that, after the cover 29 has been fitted, this terminal surface lies spaced away from the inner face of the cover, i.e. the face that is within the casing 1, so as to avoid any contact between these two surfaces.

Thus not only is the output shaft 10 prevented from moving axially between the engagement face 23 and the face of the ring 25 which faces into the casing, but also all radial movements of this portion of the shaft lying inside the casing, that is to say of the portion extending beyond the bearing sleeve 12, are prevented by the location of the end portion 25 in the hole 36 of the ring 35, which here acts as a radial bearing. Such movements would for example take place under the action of transmission forces applied by the crank and connecting rod system 9.

Figure 3:
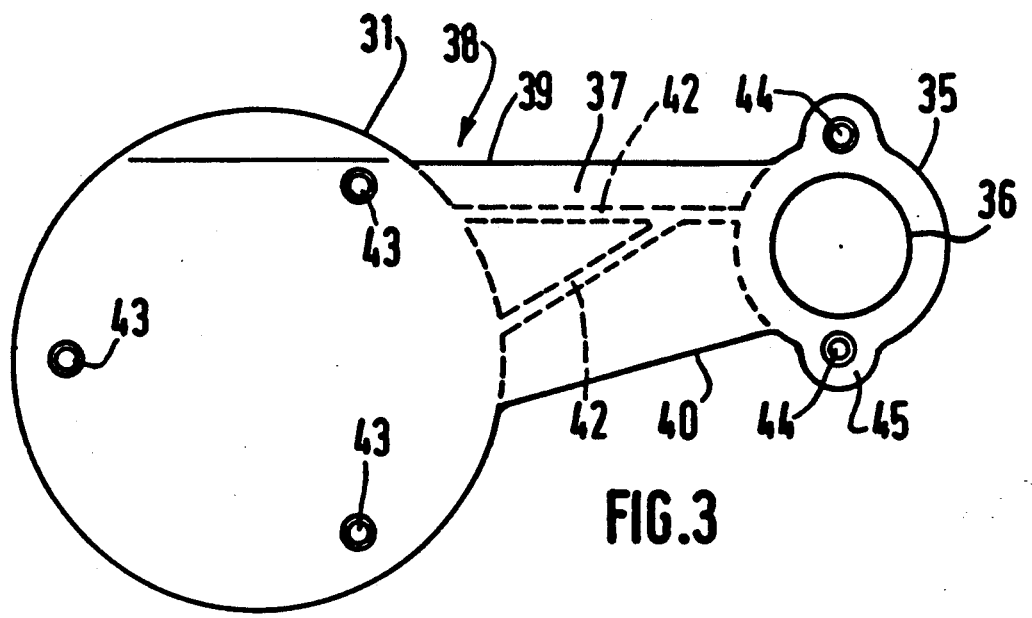
FIG. 3 is a view from below of the attached element in one embodiment.
Figure 4:
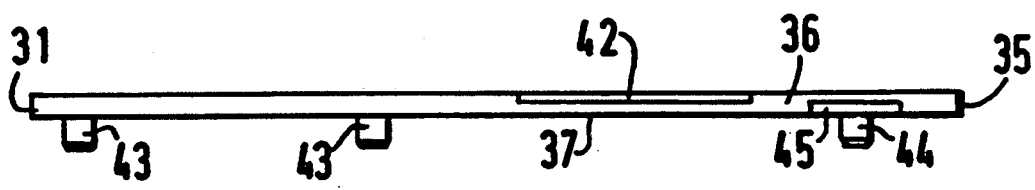
FIG. 4 is a view from above of the element seen in FIG. 3.

Referring now to FIGS. 3 and 4, the pad 31 and the ring 35 are joined together through a radial arm 37, so as to give a monobloc plate element 38, which may for example be made by moulding and which enables the pad 31, the ring 35 and the arm 37 all to be made integrally with each other.

As can be seen in FIG. 3, the arm 37 has a substantially horizontal upper edge 39, which joins the pad 31 to the ring 35 substantially at the level of the upper part (in the orientation shown in FIG. 3). The arm 37 also has an inclined lower edge 40 which joins the lower part of the ring 35 to a part of the pad 31 which is generally in the middle. This arrangement of the arm 37 is such that the bar 21 (FIG. 2) is able to be displaced in circular to and fro movement about the longitudinal axis that passes through the output shaft 10, as indicated in FIG. 2 by the phantom line 41. The thickness of the arm 37 is preferably smaller than that of the pad 31 and ring 35, and it has stiffening ribs 42.

The monobloc plate 38 is secured on the cover 29 by any appropriate means, for example by adhesive bonding. However, in this preferred example, the plate 38 has three securing pegs 43, which are spaced regularly circumferentially on the pad 31 and arranged on a pitch circle which is of smaller radius than the radius R of the pad 31. The pegs 43 are formed integrally with the latter. Two further securing pegs 44 are arranged, diametrically opposed to each other, on two ears 45 extending outwardly from the ring 35. They project in the same longitudinal plane and are located at the peripheral edge of the ring 35, i.e. their pitch circle is of the same radius as the circumference of the latter.

Figures 5, 6:
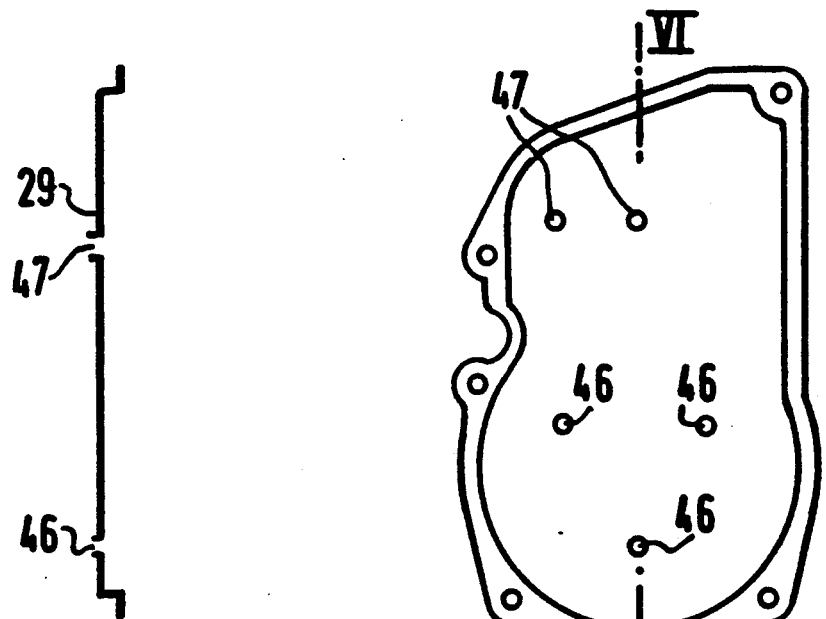
FIG. 5 is a diagrammatic view in elevation of the cover adapted for receiving the attached element.
FIG. 6 is a side view in cross section taken on the line VI—VI in FIG. 5.

The securing pegs 43 and 44 are adapted to penetrate into corresponding holes 46 and 47 respectively, which are formed through the cover 29 (see FIGS. 5 and 6). The holes 46 and 47, which here consist of circular through holes, correspond substantially in size and disposition to the pegs 43 and 44. The axial length of the latter is greater than the thickness of the cover 29, so that their ends, projecting through the cover, can be secured by, for example, hot riveting.

The cover 29 may be made of a plastics material, in which case this material will be one having a low coefficient of friction, so that the pad 31, and/or the ring 35, or the whole of the plate 38, can be made integrally with the cover 29 and in the same material.

Numerous modifications may of course be made, in particular by substitution of technical equivalents, within the scope of the invention.

What is claimed is:

1. A speed reducer comprising a hollow casing and, in said casing, a toothed wheel, means defining an axis of rotation and mounting the toothed wheel for rotation about said axis, a crank pin carried by the toothed wheel for free rotation and axial movement, the crank pin extending axially and being eccentric with respect to said axis of rotation, an output shaft rotatable in the casing, and a crank and connecting rod system coupling the crank pin to the output shaft such that the crank for converting continuous rotary motion of the toothed wheel to alternating rotary motion of the output shaft such that the crank pin moves in a circular path about the axis of rotation of the toothed wheel, the speed reducer further including a cover closing said casing and having an inner face directed into the casing, the cover having at least one flat thickened portion arranged on its said inner face and being of a material having a low coefficient of friction, said thickened portion extending over the whole circular path of the crank pin about said axis of rotation of the toothed wheel.

2. A speed reducer according to claim 1, where said thickened portion comprises a flat pad fixed to the inner face of the cover.

3. A speed reducer according to claim 1, wherein said thickened portion comprises a flat pad in the form of an unbroken circular element coaxial with the axis of rotation of the toothed wheel.

4. A speed reducer according to claim 1, which further comprises a ring having an aperture therein and fixed to the inner face of the cover.

5. A speed reducer according to claim 4, wherein said ring is coaxial with the output shaft.

6. A speed reducer according to claim 4, further comprising an arm joining said ring to the flat pad.

7. A speed reducer according to claim 4, including a second thickened portion defined by a flat pad fixed to the inner face of the cover, and further comprising a plurality of securing pegs carried by at least one of said ring and flat pad, for securing to the cover.

8. A speed reducer according to claim 6, wherein the flat pad, said ring and the arm are formed integrally with each other to form a monobloc plate.

9. A speed reducer according to claim 1, wherein the cover and said thickened portion are formed integrally with each other in a material having a low coefficient of friction.

10. A speed reducer comprising:
a hollow casing having a cover member, said cover member including an engagement portion;
a wheel member rotatably mounted in said casing and having an axis of rotation;
a crank pin disposed on said wheel member and being eccentric with respect to said axis of rotation, said crank pin being slidably engaged with and axially restrained by said engagement portion of said cover member;
an output shaft rotatably mounted in said casing; and
a coupling member coupling the crank pin to the output shaft for converting rotary motion of the wheel to alternating rotary motion of the output shaft such that the crank pin moves in a path about the axis of rotation of the wheel, said enagement portion extending over the whole path of the crank pin about said axis of rotation of the wheel and being formed from a material whose coefficient of friction facilitates the sliding engagement with said crank pin.

11. A speed reducer according to claim 10 wherein said output shaft has a free end disposed adjacent said cover member, said speed reducer further including a ring member coaxial with said output shaft and surrounding the free end of said output shaft so as to inhibit radial movement of said output shaft.

12. A speed reducer as recited in claim 11 wherein said engagement portion is a pad member fixed to said cover member, said reducer further including an arm member connecting said pad member to said ring member.

* * * * *

UNITED STATES PATENT AND TRADEMARK OFFICE
CERTIFICATE OF CORRECTION

PATENT NO. : 5,203,219
DATED : April 20, 1993
INVENTOR(S) : Pierre Blanchet

It is certified that error appears in the above-indentified patent and that said Letters Patent is hereby corrected as shown below:

Claim 1, col. 5, line 37, delete "such that the crank."

Signed and Sealed this

First Day of March, 1994

Attest:

BRUCE LEHMAN

Attesting Officer

Commissioner of Patents and Trademarks